United States Patent Office 3,127,352
Patented Mar. 31, 1964

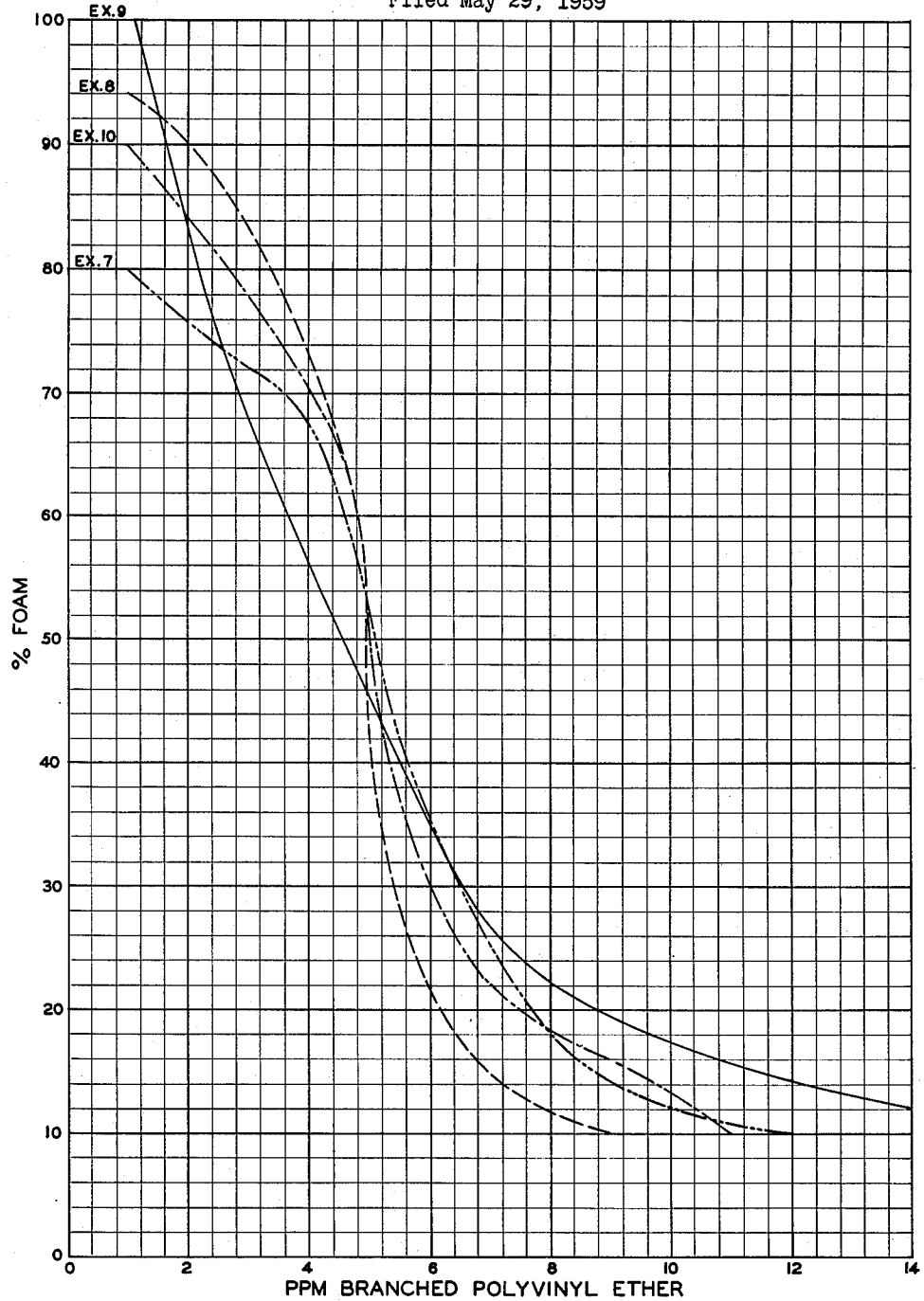

3,127,352
ANTI-FOAMER
Fred J. Stark, Jr., St. Louis, and Keith S. Eckberg, Sr., Ferguson, Mo., assignors to Petrolite Corporation, Wilmington, Del., a corporation of Delaware
Filed May 29, 1959, Ser. No. 816,741
10 Claims. (Cl. 252—52)

This invention relates to a method of preventing, reducing and/or destroying foam in liquid organic systems, such as liquid hydrocarbon systems, and most particularly in mineral oil systems. This invention also relates to liquid organic materials, such as liquid hydrocarbons and most particularly mineral oils, containing agents capable of preventing, reducing and/or destroying foam therein.

Froth or foam often occurs as undesirable incidental features of liquid organic systems. For example, hydrocarbon oils and compositions containing hydrocarbon oils tend to foam when agitated in the presence of gases or vapors, such as air, steam, oil vapor, products of combustion and the like.

The amount of foam or froth varies with the conditions under which the oil compositions are agitated, as well as the character of the composition. Under some conditions, the volume of foam or froth produced is many times that of the original oil, and even with mild agitation, substantial amounts of foam are produced in many oil compositions. In preparing and using such oils and oil compositions commercially, they are subjected to agitation under a wide range of conditions and frequently undesirable amounts of foam or froth are produced.

We have now discovered a method of preventing, reducing and/or destroying foam in liquid organic systems, such as in liquid hydrocarbon systems and most particularly in mineral systems, characterized by adding to said systems the branched polyvinyl ethers hereafter described in minor amounts sufficient to prevent, reduce and/or inhibit such foaming. We have found that organic liquids, such as liquid hydrocarbons, and most particularly mineral oil containing these antifoamers are markedly resistant to foaming even under the most violent conditions encountered in commercial practice. The presence of these antifoamers cause the oil foam to rupture, thereby quickly destroying the foam. In most cases, its presence so rapidly breaks the oil foams that substantially all foam is destroyed as fast as it is formed. In addition, these antifoamers are inexpensive and thus commercially desirable.

Our process consists in subjecting a foaming or potentially-foaming composition to the action of a small proportion of the antifoamer, thereby causing the foaming properties of the liquid to be diminished, suppressed or destroyed. In applying our process to the reduction or destruction of a foam, the anti-foamer is poured or sprayed or dripped into the body of foam on top the liquid as desired; and the foam breaks and is destroyed or reduced, substantially at once, as a consequence of such addition of said reagent. In applying our process to the prevention of foaming, the anti-foamer is admixed, in some predetermined small proportion, with a potentially-foaming liquid, by any desired or suitable procedure. The ability of the system to foam is destroyed or at least materially reduced by such addition of said anti-foamer.

The agents useful as antifoamers in liquid hydrocarbon systems are polyvinyl ethers having repeating

—CH$_2$—CH—
   |
   O
   |
   Z units, wherein Z is a branched hydrocarbon chain also referred to as "branched polyvinyl ethers." In general, the defoaming action of this polymer is a function of Z's branching and the proximity of such branching to the oxygen. Thus, in general, the closer this branching is to the oxygen group, the more effective is its defoaming action.

Branching most advantageously occurs at the alpha or beta carbon, since gamma branching has less effect than alpha or beta branching. Branching as herein defined means any departure from a linear aliphatic configuration. Thus, branched chains include aliphatic side chains as well as cyclic structures such as aryl and cycloalkyl groups.

Examples of branching on the alpha group include groups within the general formula where

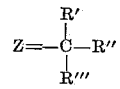

wherein at least two of the R groups are not hydrogen groups, for example where the R's are alkyl, aryl, cycloalkyl, etc. or where two R groups are joined together to form a cyclic radical, for example cycloalkyl, phenyl, etc. Specific examples of Z include: sec-butyl, isopropyl, cyclohexyl, phenyl, and the like.

In the case where branching occurs on the beta carbon, the above statements as to branching apply with equal force except that such modification occurs on the beta rather than the alpha position. For example, where Z has a —CH$_2$— group at the alpha position, the values for Z would be the same as those stated above except for the additional —CH$_2$— group, i.e.

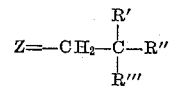

where the R's have the meanings stated above. Examples of beta branching include isobutyl, 2-ethyl hexyl, etc.

The molecular weight of the polymer is critical and those having low molecular weights are not as effective as those having a higher molecular weight. Therefore, the branched polyvinyl ethers operative in this invention should have a molecular weight of at least about 150,000 to several million or more, for example about 200,000 to 600,000 or higher, but preferably 500,000 or higher. It is indeed surprising that these high molecular weight branched polyvinyl ethers are so effective as antifoamers in oil, in view of their limited oil solubility. Provided the polymer has the above molecular weights, its type, whether isotactic, syndiotactic, or atactic is immaterial. Because of their commercial availability the branched aliphatic polyvinyl ethers are most advantageously employed. Typical of the branched polyvinyl ethers of this invention is polyvinyl isobutyl ether. An excellent description of such polymers is found included in a chapter on vinyl ether polymers—Chapter XI of "Vinyl and Related Polymers," by Schildknecht (Wiley 1952), and particularly on pages 609–614 wherein methods of preparation and types of products, etc. are described.

Although the method of adding the anti-foamer to the organic liquid is not critical, for convenience of handling it is preferable to disperse or dissolve it in a suitable medium or solvent. Examples of suitable solvents or dispersants are petroleum hydrocarbons, kerosene, mineral spirits, benzene, toluene, xylene, etc., may be employed. Solvents and dispersants are essentially medium for placing the antifoamer at the site where it will be most effective. In general, at least 1 p.p.m. by weight of the antifoamer based on weight of the organic liquid should be present in the system, although in practice we employ 3 to 100 p.p.m., but preferably 5 to 20 p.p.m. Of course, greater amounts of antifoamer can be employed but commercial consideration demands that its concentration be kept to a minimum. In general, in commercial operations we seldom like to employ more than 20–25 p.p.m. However, it should be understood that the optimum amount of the particular agent employed will depend on the specific system in which it is employed. Since they are used in such small quantities they can be used as antifoamers without deleteriously effecting the other properties of the oil.

One particularly advantageous field of use for the anti-foam agents of our invention is in lubricants for internal combustion engines, such as automotive, aviation, diesel and like engines, because we have found that even under the high temperature of operation of these engines, these compounds retain their foam-inhibiting properties. In lubricating such engines, appreciable foaming of the motor oil seriously interferes with effective lubrication. For instance, aviation oils (either straight or compounded oils) tend to foam at the low barometric pressures encountered at high altitudes. Also in lubricating such engines, particularly aviation engines, the lubricating oil is circulated under pressure through the parts to be lubricated. In doing so gear pumps are usually employed in supplying pressure oil to the engine and returning the oil from the engine sumps to the reservoir tank. In such systems, the scavenger pump is usually of such capacity as to maintain the engine sump in a substantially dry condition. With such dry sump systems, the scavenger pump frequently pumps large volumes of air with the oil, this air becoming dispersed in the oil. Under such conditions, excessive foam often leads to loss of the oil from the engines and impairs the lubrication. By the present invention, such foaming can be readily overcome or suppressed. For example, an appropriate amount of our liquid anti-foamers can be introduced into the circulating oil and dispersed therein by the gear pumps, or oil concentrates of the anti-foamers can be intermittently injected into the oil and uniformly dispersed therein by such gear pumps whenever substantial amounts of foam appear in the system. Further, such foaming can be prevented and the engine effectively lubricated at all times by employing an improved lubricant containing these liquid anti-foamers dispersed therein from the beginning.

While our anti-foamers and improved motor oils are particularly advantageous in lubricating engines wherein the oil is circulated under pressure by means of such gear pumps, they are also useful and advantageous in lubricating certain types of engines using splash lubrication. Also, modern diesel engine oils usually contain relatively large amounts of additives of the detergent or detergent-dispersion type. It has been found that such additives promote foaming. Accordingly, many diesel oils foam badly. By the present invention, such foaming is effectively prevented and improved anti-foaming Diesel oils readily obtained.

Another advantageous field of use is in gear lubricants, particularly for transmission gears of automotive equipment and the like. In lubricating such gears, the oil composition is violently agitated by the rotating gears and substantial amounts of foam are formed. This foam interferes with the lubrication and cooling of the gears. By the present invention, this foaming and its attendant difficulties in gear lubricants are effectively prevented and overcome.

Still another field of use for the products of our invention is in the light oils used in steam turbines. With these light oils, agitation may produce considerable foaming. By the present invention, such foaming of light oils is effectively prevented. Furthermore, there is often a tendency for steam turbine oils to emulsify with the water with which they are mixed. We have found that the anti-foam agents of our invention have an additional advantage in this use, because they generally increase the resistance of such oils to emulsification.

Our improved anti-foaming agents also may be advantageously added to crude oil to prevent foaming in pipe lines, storage tanks and the like, particularly such oils as are produced in western Venezuela and in certain sections of the U.S.A. where foaming is a problem. It is usually advantageous to add the anti-foamer to the crude oil in solution in a solvent such as one of those indicated above, because of the small amount of anti-foamer used in a large volume of crude. Good results can be obtained when the anti-foamer is added to the crude oil when the crude oil is being fed from the wellhead to a gas separator. The agitation secured at this point is sufficient for distributing the solution of anti-foamers through the crude oil. The effect of adding such solutions of our anti-foamers is that existing tankage and equipment for handling such crudes can, for its capacity, about double its throughput. Our new anti-foamers and compositions are also useful in other oil compositions and effectively prevent the foaming thereof. Indeed, they are useful and advantageous in any hydrocarbon oil or oil composition whether used as a lubricant or not, and in which it is desired to prevent foaming. However, they are particularly effective in combating foaming in mineral lubricating oils and lubricants.

The following examples are presented by way of illustration and not of limitation.

EXAMPLES

The effectiveness of chemical additives as anti-foamers is tested as follows by methods employed by Esso Research and Engineering Laboratories.

*Test I.*—This procedure developed by Professor Ross at Rensselaer Polytechnic Institute, determines the foam forming tendencies of the oil plus additive by measuring the maximum diameter film that can be formed on a ring—the smaller the film, the better its anti-foam characteristics. It employs closely sized series of rings of varying diameters.

*Test II.*—This simple foaming test, measures the amount of "foam" formed under specific conditions.

*Test I*

The following procedure was developed for evaluating the effectiveness of various chemical compounds on the foaming characteristics of organic materials. The method depends on the reduction of film forming property of the crude oil with the addition of the anti-foamer. The smaller the film, the better the agent.

In this test a series of 55 rings varying in diameter from 0.75 inch to 3.45 inches are used. They are made of 20 gauge Alumel. Each ring differs from the next in the series by 0.05 inch in diameter. The rings are made by wrapping the wire around a metal mandrel; the mandrel resembles a step-pulley in which each step is a precisely measured ring diameter. The ends of the wire are twisted together to form the ring and one end of the wire extends to make the handle.

The organic material or oil to be tested is placed in a one liter beaker in a constant temperature bath at 85°. The anti-foam agent is then added to the oil in the form of a kerosene solution. The additive plus solvent is generally not more than 0.5 vol. percent on the oil tested. Prior to the test, the additive and oil are thoroughly agitated to make sure that the mixture is homogeneous. A small electric stirrer is used for this purpose.

The actual test procedure is as follows: (1) The ring is dipped into the oil until completely immersed in a vertical position. (2) The ring is withdrawn in the vertical position rapidly and smoothly, and then rotated to a horizontal position. (3) The ring is allowed to drain. The excess oil drains in droplets from the center of the film causing it to sag in when producing a funnel shaped cavity in the center. (4) An observation is then made of whether a film has formed. If the hole closes and a film remains for about 5 secs. or more, then a film is held to have been formed. (5) The ring of smallest size that just fails to allow the formation of a film is determined and its size recorded as a measure of the film forming ability of the solution under test.

Test II

A "foam making" apparatus is used to simulate the formation of "foam." It consists of bubbling nitrogen through a graduate of oil and stirring the resultant mixture with a simple "egg beater" stirrer. Both the nitrogen bubbling and the mixing is required to make foam that is comparable to that found in field operations.

Running at the operating conditions of 70° F. oil will generally expand to twice its normal volume when no additive is added.

Details of the test are as follows: (1) the additive to be evaluated is dissolved in kerosene (generally no more than 0.5 wt. percent on crude). This solution is then added to 500 cc. of oil. In order to aid in distributing the additive in the oil, the crude is poured into the graduate in increments (200, 200, and 100 ml.) and aliquot portions of the solution are added with each increment. The mixer is operated for a period of 5 minutes prior to bubbling with nitrogen.

Nitrogen is then introduced through the hypodermic tubing. The initial "foam" level is then recorded. Aeration is continued until the level of foam in the graduate has stabilized (no longer than an hour or so). The foam level is again read and the percent "foam" formed is calculated. This is done as follows:

$$\frac{V_2 - V_1}{500} \times 100$$

In evaluating compounds according to the above tests, a satisfactory compound should have a value of 2.5 or less but preferably less than 2.0 in Test I and 20% or less but preferably less than 10% or less in Test II in concentrations less than 100 p.p.m. but preferably less than 20 p.p.m.

vinyl ethers are ineffective. To be effective, the branched polyvinyl ether should have medium but preferably high molecular weight.

While our invention has been described above with reference to various specific examples and embodiments, it will be understood that the invention is not limited to such illustrative examples and embodiments. For example, in addition to the homopolymeric branched polyvinyl ethers, copolymeric polyvinyl ethers can also be employed wherein more than one branched monomeric vinyl ether can be copolymerized. In addition, branched vinyl ethers can be copolymerized with non-branched vinyl ethers. In general, those copolymers which contain the greater amounts of branched vinyl ethers, are more effective than those containing less of the branched monomer. In addition, branched vinyl monomers may be copolymerized with one or more ethylenically unsaturated compound containing non-ether groups, for example those of the formula $$R_1-\underset{\underset{R_2}{|}}{C}=\underset{\underset{R_3}{|}}{C}-R_4$$

where the R substituted group, for example, is hydrogen, halogen, alkyl, cycloalkyl, aryl, radicals containing functional groups, etc. Example of copolymers of polymeric vinyl ethers and methods for preparing them are well known, examples of which can be found in "Vinyl and Related Polymers" by Schildknecht, Wiley and Sons, 1952—Chapter XI on Vinyl Ether Polymers. Since these unbranched monomer ethers should not be of such nature or used in such amounts that would detract from the antifoam effectiveness of the polymeric branched vinyl ether group, they are generally copolymerized in only small amounts.

TABLE I.—POLYVINYL ETHERS EMPLOYED AS ANTI-FOAMERS $$-\left(\underset{\underset{\underset{Z}{|}}{\underset{O}{|}}}{CH_2-CH}\right)_n-$$

| No. | Z | Source | Viscosity | Ring Test | Foam Test |
|---|---|---|---|---|---|
| 1 | n-octadecyl | Archer-Daniels Midland Co. | low | Up to 700 p.p.m. negative (i.e. little or no effect as anti-foamer). | Up to 700 p.p.m. negative. |
| 2 | ethyl | Lutanol* A25 | do | Up to 700 p.p.m. negative. | Do. |
| 3 | do | Lutanol A50 | high | do | Do. |
| 4 | methyl | Lutanol M40 | do | do | Do. |
| 5 | n-butyl | | do | do | Do. |
| 6 | isobutyl | Lutanol J30 | low | 100 p.p.m./3.45 | Do. |
| 7 | do | Oppanol C* KW110 | high | 12.5 p.p.m./<2.0 | 12 p.p.m./10%. |
| 8 | do | Oppanol C KW116 | do | 12.5 p.p.m./<2.0 | 9 p.p.m./10%. |
| 9 | do | Oppanol C KW121 | do | 12.5 p.p.m./<2.0 | 13 p.p.m./10%. |
| 10 | do | Oppanol C KW125 | do | 12.5 p.p.m./<2.0 | 11 p.p.m./10%. |
| 11 | do | Lutanol J60 | medium | 100 p.p.m./2.90 | 100 p.p.m./8%; 50 p.p.m./18%. |

*"Lutanol" and "Oppanol" are trademarks of Badische Anilin- & Soda. High molecular weight 2-ethylhexyl, isopropyl, secondary butyl, tertiary butyl, cyclohexyl, phenyl, 2,2,4-trimethyl pentyl, 2-methyl butyl polyvinyl ethers (i.e. having these Z values) when similarly tested are also effective as anti-foamers.

In the above table, viscosity is related to molecular weight. A high viscosity polymer has a molecular weight of above $500$–$600 \times 10^3$ or more, a medium viscosity has a molecular weight of greater than $150$–$200 \times 10^3$ up to approximately $500 \times 10^3$, and a low viscosity has a molecular weight of greater than $75 \times 10^3$ up to about $150 \times 10^3$.

The effectiveness of branched polyvinyl ethers is also illustrated by the attached drawing in which concentration in p.p.m. of isobutyl polyvinyl ether is plotted as a function of its anti-foaming effect. The particular polymeric species employed are those referred to in the examples shown in the above table.

From the above, it is evident that straight chained polyvinyl ethers and low molecluar weight branched poly-

Having thus described our invention, what we claim as new and desire to secure by Letters Patent is:

1. A composition of reduced foaming properties consisting essentially of a hydrocarbon liquid having foaming tendencies which contains a minor amount, sufficient to reduce the foaming of said hydrocarbon liquid, of a polymer of a polyvinyl ether having a molecular weight of at least about 150,000 wherein the radical on the ether group contains a member selected from the class consisting of a branched aliphatic group, an aryl group and a cycloaliphatic group.

2. A composition of reduced foaming properties consisting essentially of a hydrocarbon liquid having foaming tendencies which contains a minor amount, sufficient to reduce the foaming of said hydrocarbon liquid, of a polymer of a molecular weight of at least 150,000 having repeating units of the formula

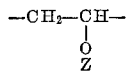

where Z is selected from the group consisting of

and

wherein at least two of the R's are members selected from the group consisting of alkyl, aryl, cycloalkyl, and an aryl and a cycloalkyl ring formed from joining two R groups, and the unsubstituted R group is hydrogen.

3. The composition of claim 2 wherein Z is a branched alkyl group.

4. The composition of claim 2 where the molecular weight is at least about 500,000.

5. The composition of claim 4 where the branched alkyl group is isobutyl.

6. The composition of claim 4 where the branched alkyl group is isopropyl.

7. The composition of claim 4 where the branched alkyl group is secondary butyl.

8. The composition of claim 4 where the branched alkyl group is 2-ethylhexyl.

9. The composition of claim 4 where the cycloalkyl group is cyclohexyl.

10. The composition of claim 4 where the aryl group is phenyl.

References Cited in the file of this patent

UNITED STATES PATENTS

| | | |
|---|---|---|
| 2,020,714 | Wulff et al. | Nov. 12, 1935 |
| 2,389,227 | Wright | Nov. 20, 1945 |
| 2,909,489 | Fields | Oct. 20, 1959 |